(12) United States Patent
Bringht

(10) Patent No.: US 12,518,244 B1
(45) Date of Patent: Jan. 6, 2026

(54) GROCERY PRODUCT RESTOCKING SYSTEM AND METHODS

(71) Applicant: Bringht Line, LLC, Cleveland, OH (US)

(72) Inventor: Da'Juan Bringht, Cleveland, OH (US)

(73) Assignee: Bringht Line, LLC, Cleveland, OH (US)

(*) Notice: Subject to any disclaimer, the term of this patent is extended or adjusted under 35 U.S.C. 154(b) by 0 days.

(21) Appl. No.: 17/655,183

(22) Filed: Mar. 17, 2022

(51) Int. Cl.
| | | |
|---|---|---|
| *A47F 1/04* | (2006.01) | |
| *B65G 23/22* | (2006.01) | |
| *G06Q 10/087* | (2023.01) | |
| *G06Q 20/18* | (2012.01) | |
| *G07F 11/42* | (2006.01) | |

(52) U.S. Cl.
CPC ................................. *G06Q 10/087* (2013.01)

(58) Field of Classification Search
CPC .................................................... G06Q 10/087
See application file for complete search history.

(56) References Cited

U.S. PATENT DOCUMENTS

| | | | | |
|---|---|---|---|---|
| 4,284,145 | A * | 8/1981 | Small .................... | A01D 17/101 171/126 |
| 5,404,700 | A * | 4/1995 | Kobuchi ................. | A01D 45/26 56/121.41 |
| 8,616,822 | B2 * | 12/2013 | Winkler ............... | B65G 1/0435 211/151 |
| 9,406,041 | B2 * | 8/2016 | Allison ............... | G06K 7/10861 |
| 9,536,236 | B2 | 1/2017 | Hay | |
| 9,600,799 | B1 * | 3/2017 | Allen ........................ | A47F 7/04 |
| 10,181,113 | B2 | 1/2019 | Rivalto et al. | |
| 10,643,059 | B2 | 5/2020 | Adato et al. | |
| 2004/0262326 | A1 * | 12/2004 | Christensen ............ | G07F 11/34 221/281 |
| 2007/0125727 | A1 * | 6/2007 | Winkler ............... | B65G 1/0435 211/59.2 |
| 2010/0249990 | A1 * | 9/2010 | Tsao ..................... | G06Q 10/087 700/218 |
| 2017/0323252 | A1 * | 11/2017 | Jones ...................... | G01S 13/88 |
| 2017/0330140 | A1 * | 11/2017 | Jones ........................ | G01F 1/34 |
| 2018/0321660 | A1 * | 11/2018 | Nemati ................ | B65G 1/1376 |
| 2019/0031441 | A1 * | 1/2019 | Jin .......................... | G07F 11/58 |
| 2019/0163876 | A1 * | 5/2019 | Remme ................. | G16H 40/20 |
| 2020/0208896 | A1 * | 7/2020 | Yee ......................... | F25D 19/04 |
| 2022/0058908 | A1 * | 2/2022 | Stoenescu ........... | G07F 11/1653 |

FOREIGN PATENT DOCUMENTS

DE      102005058478      6/2007

OTHER PUBLICATIONS

Claudia Longo, Pitch challenge gives manufacturing startups a chance to test their ideas, news article, Dec. 8, 2020, The Land Posting, United States.

The Daily, Sears think[box] partners with community innovator to create produce-stocking device, news article, Mar. 1, 2021, CWRU, United States.

Da'Juan Bringht, Automated Restocking System, Business overview statement, Ohio State University, United States.

* cited by examiner

*Primary Examiner* — Talia F Crawley
(74) *Attorney, Agent, or Firm* — Kramer Law Clinic

(57) ABSTRACT

A grocery product restocking system with accompanying methods comprising a grocery stand unit and moveable, restockable platforms which communicate with a processing unit to automatically restock grocery product within a display area.

10 Claims, 9 Drawing Sheets

GROCERY PRODUCT RESTOCKING SYSTEM AND METHODS

TECHNICAL FIELD

The invention generally relates to grocery store stocking systems. More specifically, the invention relating to grocery product displays that can restock themselves.

BACKGROUND OF THE INVENTION

Conventional methods require grocery store employees to carefully monitor the displays to determine when grocery products require restocking. If restocking is required during a store's hours of operation, this manual restocking can inhibit customers' access to the grocery products. A customer's access to the display is particularly important if the grocery product is perishable as a customer may like to choose their specific product.

U.S. Pat. No. 10,181,113 B2 discloses a system for stocking grocery products. This reference relies largely on a vending machine type of access to the customer, rather than a stocking system compatible with displays of grocery products which would allow the customer to choose which grocery product in the display to purchase.

Thus, there is a need for a grocery store's displays to remain stocked at all hours of a store's operation in order to ensure that customers are able to access and purchase grocery products.

Additionally, there exists a need for an automated restocking system of grocery products that allows customers to continually interact with the display of the grocery products within the grocery stand unit.

BRIEF SUMMARY OF THE INVENTION

It is therefore an object of the present invention to provide a system which facilitates automated restocking of grocery products in a grocery stand unit.

It is yet another object of the present invention to provide for a system which continually restocks grocery products in a grocery stand unit over time.

The invention achieves the above objects, and other objects and advantages which will become apparent from the description which follows, by providing a system for displaying and stocking grocery products, comprising: a grocery stand unit with an internal storage area and a display area, a plurality of platforms in the internal storage area adapted to hold the grocery products, and a weight sensor capable of detecting the weight of grocery products in the display area. An opening in the grocery stand unit allows for access to the internal storage area and platforms within the grocery stand unit. Finally, a means operatively connected to the weight sensor for circulating the platforms with respect to the display area for restocking the display area is added.

In the preferred embodiments of the invention, the restocking system is provided with a display area that is at a downward angle and configured with one or more display conveyors that are configured with ridges to help facilitate the movement of grocery products. The plurality of platforms each have a platform conveyor that may have ridges to help facilitate the movement of the grocery products. Each platform has a door at the side facing the display area which can open to allow the grocery product to transfer from the platform to the display area. There exists a means for rotating the display conveyer and each of the platform conveyors. The plurality of platforms follow a closed path. A weight sensor monitors the weight of grocery products in the display area. A light system indicates that platforms are empty. The grocery stand unit also contains a cooling system.

Other embodiments of the invention include a grocery stand unit with an internal storage area and a display area, a plurality of platforms in the internal storage area adapted to hold the grocery products, and a weight sensor capable of detecting the weight of grocery products in the display area, the weight sensor can be utilized to detect the removal of grocery products from the display area. Following this, the platforms are cycled according to the detected removal of grocery products from the weight sensor, and the grocery products are conveyed onto the display area.

DETAILED DESCRIPTION OF THE PREFERRED EMBODIMENTS

Figure 1A:
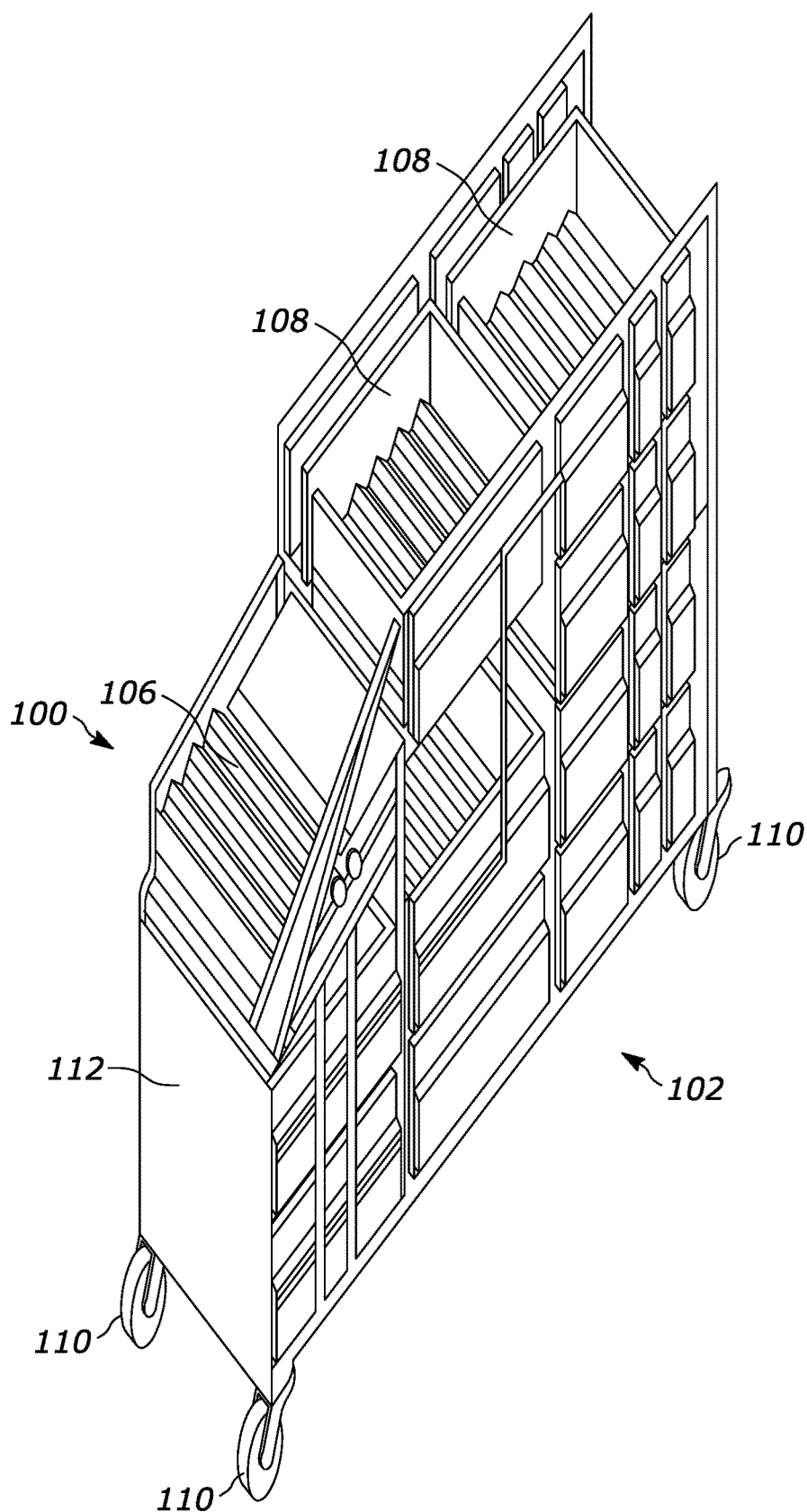
FIG. 1A is an isometric view of the grocery stand unit with only one restocking system.

A grocery product restocking system in accordance with the principles of the invention is generally indicated by reference numeral 100 in the various Figures of the attached drawings wherein numbered elements in the figures correspond to like numbered elements herein.

The following describes a system and method related to a restocking system 100 for grocery products.

FIG. 1A discloses a restocking system 100 including grocery stand unit 102 having an internal storage area 104 with a display area 106. In preferred embodiments, the display area 106 is at a downward angle. A plurality of platforms 108 within the internal storage area 104 are adapted to hold grocery products. FIG. 1A also discloses wheels 110 on the grocery stand unit 102 which aid in movement of the grocery stand unit 102. Finally, a front panel 112 is attached to the grocery stand unit 102. In some embodiments, multiple front panels 112 may be added to the grocery stand unit 102.

Figure 1B:
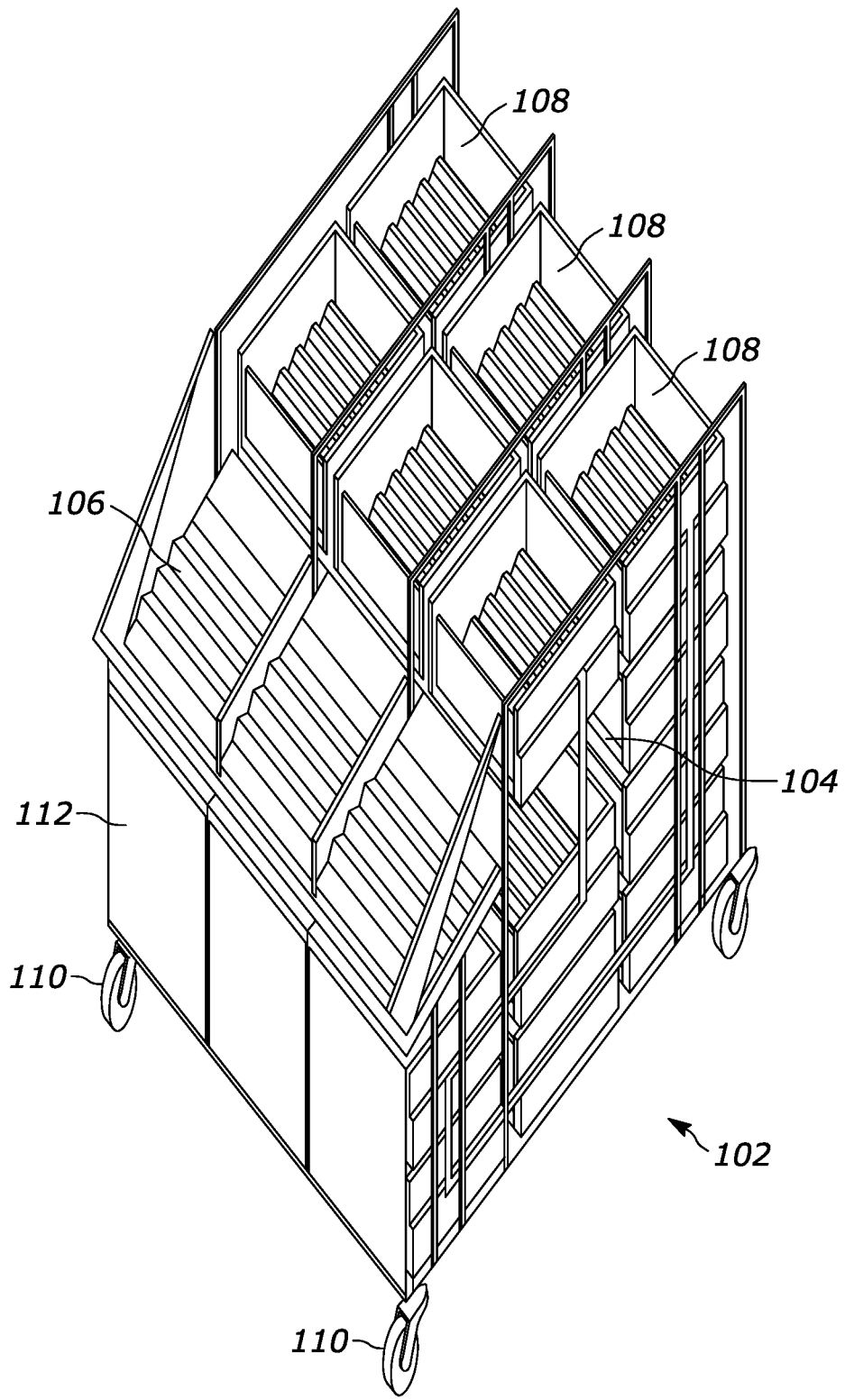
FIG. 1B is an isometric view with the top of the grocery stand unit removed.

In FIG. 1A, there is one restocking system 100 held within one grocery stand unit 102. In FIG. 1B, there are three individual restocking systems 100 held within one grocery stand unit 102. In alternate embodiments, any number of restocking systems can be contained within a grocery stand unit 102.

Figure 2:
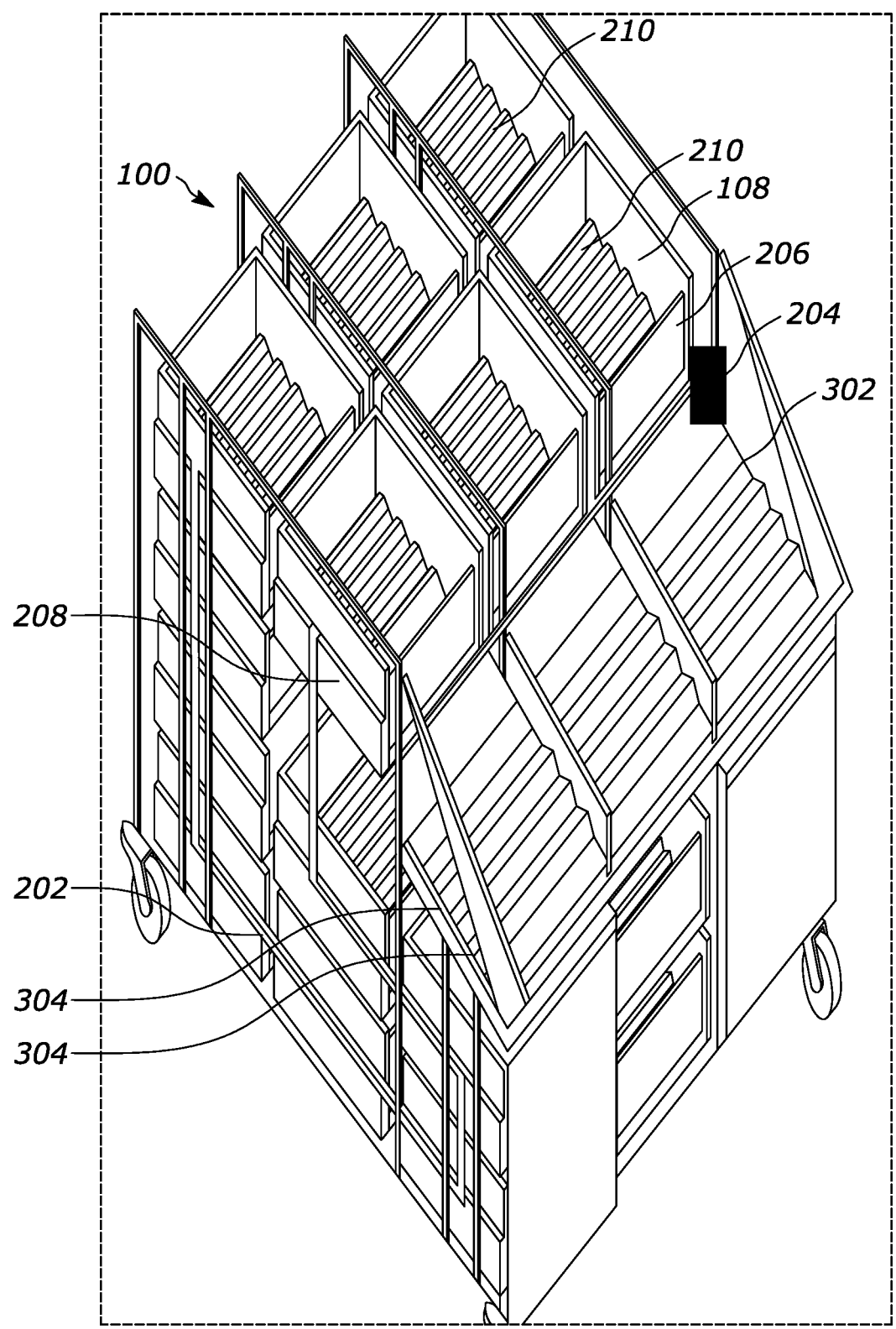
FIG. 2 is an isometric view where the opening for accessing the restocking system is open.
Figure 3:
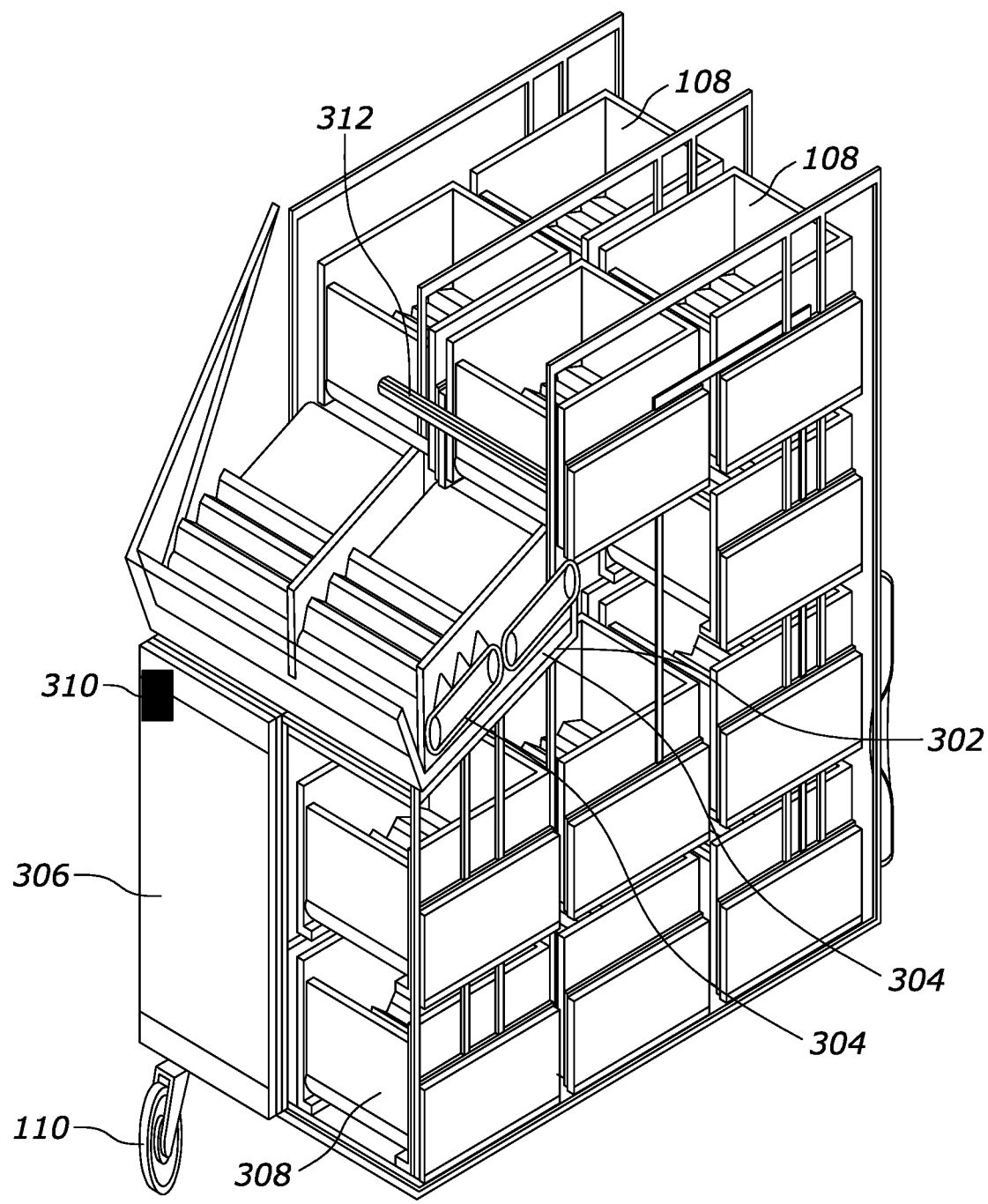
FIG. 3 is an isometric cross-sectional view of the grocery stand unit.

Referring now to FIGS. 2 and 3, three restocking systems 100 are shown. Each restocking system 100 contains a plurality of platforms 108 which travel along a closed path 202 described in further detail herein below. Each platform 108 includes a door 206 on the side facing the display area 106. When the platform is in the position closest to the display area 208, the door 206 may open to allow grocery products to transfer onto the display area 106. A weight sensor 204 operatively connected to the display area 106 signals when the door 206 will open. A system is operatively connected to the weight sensor 204 for circulating the platforms 108 with respect to the display area 106 for restocking the display area 106.

In some embodiments, each platform 108 may contain a platform conveyor 210 to facilitate movement of the grocery products onto the display area 106. The display area 106 contains at least one conveyor, known as the display conveyor 302. In alternate embodiments, the display conveyor 302 may comprise several intermediate conveyors 304.

Figure 6:
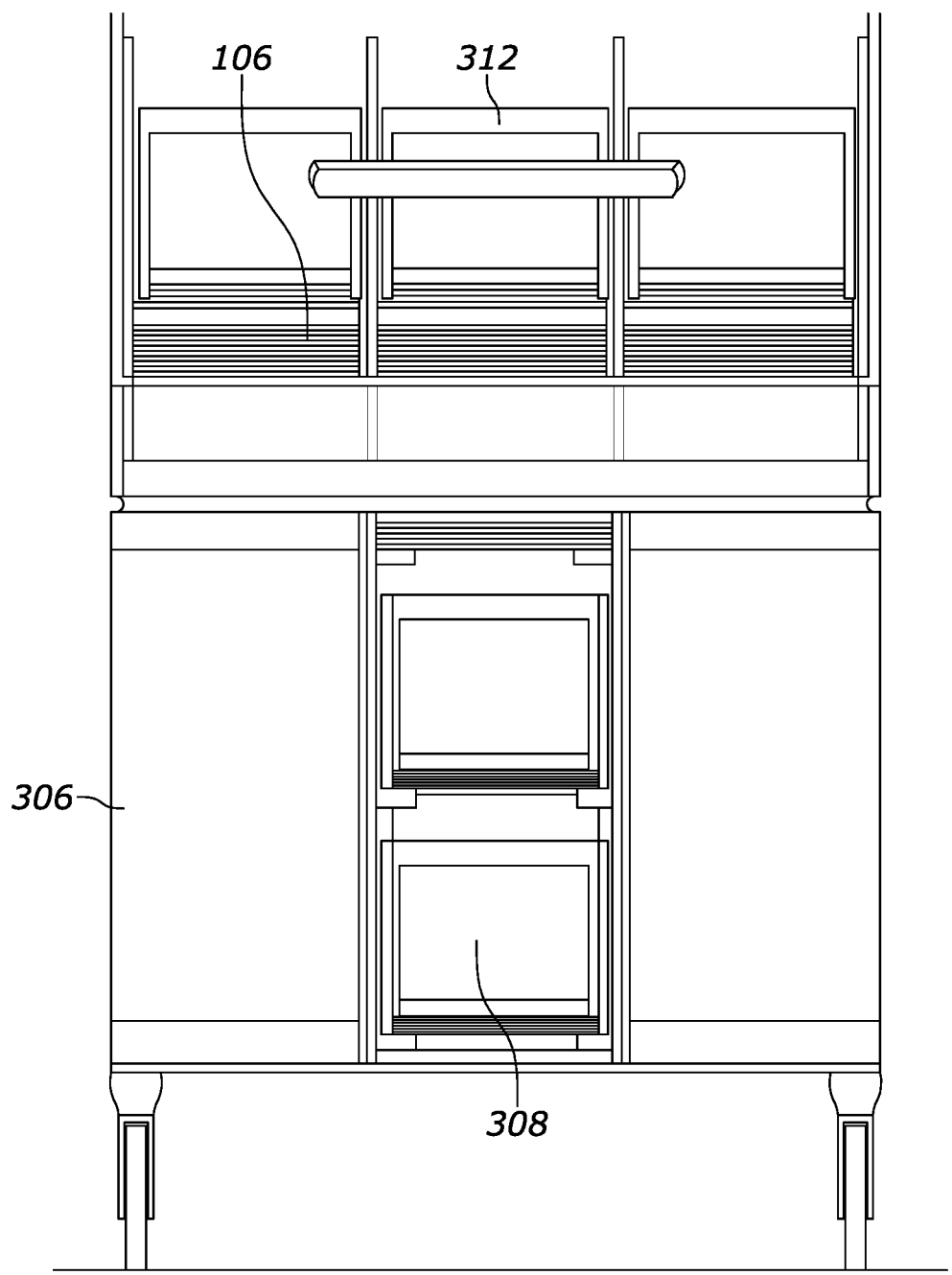
FIG. 6 is a front perspective view where the opening for accessing the restocking system is open.

At least one front panel 306 exists below the display area 106. The front panel 306 is moveable to reveal an opening in the grocery stand 308 for accessing the internal storage area 104 of the grocery stand unit 102. This allows a platform in a position accessible by the opening in the grocery stand 308 to be restocked. This is further shown in FIG. 6.

A light system 310 is added to at least one front panel 306. In some embodiments, the light system contains three different colored lights that communicate with the weight sensor 204 to indicate the amount of grocery products remaining in the display area 106. Each restocking system 100 preferably has its own light system 310.

In addition, FIG. 3 discloses a light 312 located above the display area 106. The light 312 obscures the view into the internal storage area 104 and platform 108 located closest to the display area 106. In preferred embodiments, the light 312 conceals the grocery products within the internal storage area 104.

Figure 4:
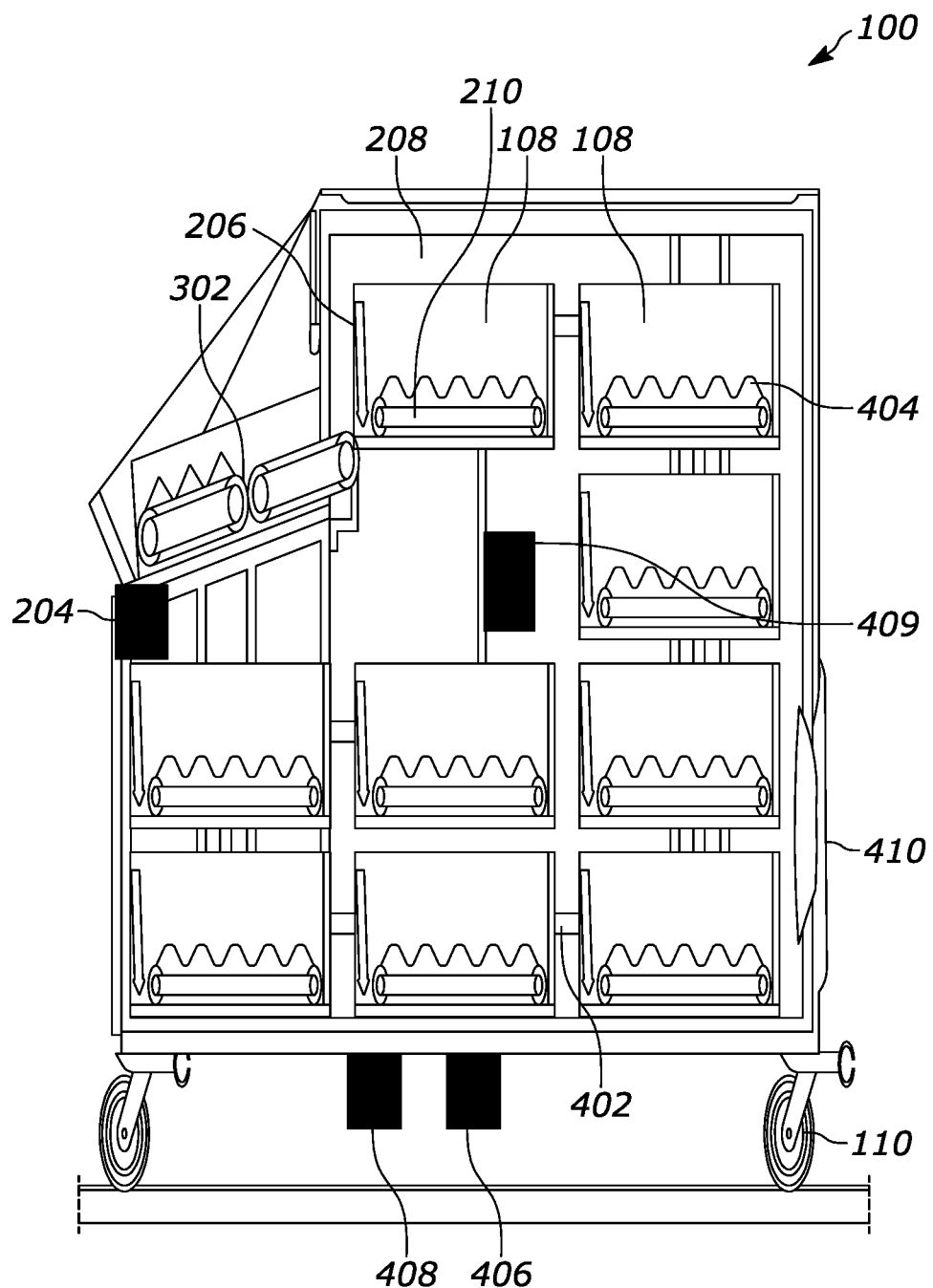
FIG. 4 is a cross-sectional view of the grocery stand unit.

FIG. 4 is a cross-sectional view of one restocking system 100. The platforms 108 within the internal storage area 104 move along a closed path 202. The shape of the closed path 202 may vary depending on the number of platforms 108 and the shape of the internal storage area 104. The present embodiment shown in FIG. 4 discloses an L-shaped closed path 202. The platforms 108 preferably have clearance to follow the closed path 202 and avoid contact with another platform 108.

In the preferred embodiments, the closed path 202 is implemented by a track 402 which guides the movement of the platforms 108. Each platform 108 is attached to the track 402 by a bracket 414. The bracket 414 is configured to prevent rotational movement of the platform 108 relative to the track 402.

Figure 7:
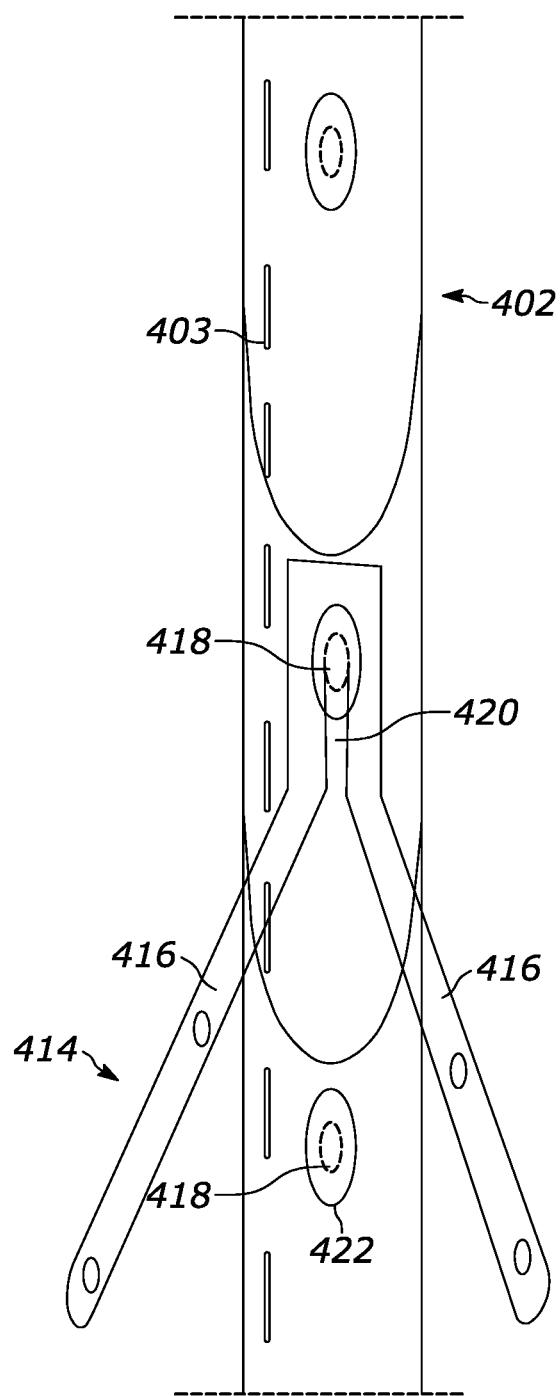
FIG. 7 is an elevational view of the bracket and track system.

FIG. 7 discloses the preferred embodiment of the bracket 414. In the preferred embodiment, the track 402 is a chain 403 and the bracket 414 is configured to connect operatively to the chain 403. The bracket 414 comprises two arms 416 which are configured to keep the center of gravity of the platforms 108 below the point where the bracket 414 is connected to the chain 403. The bracket 414 is connected to the chain 403 by allowing a pin 418 on the chain 403 to slide into a slot 420 in the bracket 414. The pin 418 has a face 422 that has a larger diameter than the shaft of the pin 418 which prevents the bracket from sliding off the pin 418. The bracket 414 is shown on a vertical section of the track 403. As the platforms 108 cycle around the track the bracket 414 will rotate about the pin 418 allowing the platforms 108 to remain horizontal. The chain 403 is forced to follow a fixed path via sprockets 409 which allow the platforms 108 to cycle through the internal storage area 104 without the platforms 108 colliding with one another. In the preferred embodiment there is a second track (not shown) on the opposite side of the platforms 108. In other embodiments the track 402 can be manipulated into different shapes to fit the defined parameters of the internal storage area 104.

A motor 408 is operatively connected to the track 402 by a set of sprockets 409 and a processing unit 406. The chain 403 is complimented by a set of gear teeth on the sprockets 409. The weight sensor 204 on the display area 106 communicates with the processing unit 406 to determine when the plurality of platforms 108 move along the closed path 202 in response to the display area 106 being empty.

Each platform 108 contains a platform conveyor 210. There are two rotating bodies 412 defining the length of both the platform conveyor 210 and any additional intermediate conveyor 304. Each platform 108 contains a secondary motor operatively connected to the rotating bodies 412. Those rotating bodies are powered by the motor 408. The platform conveyor 210 contains ridges 404 which keeps the grocery products in registration with the platform 108 during movement. The number of ridges and the height of the ridges 404 is configured to prevent a number of grocery products from rolling or falling within the platform 108. In addition, when a platform 108 is in the position closest to the display area 208 and the door 206 at the front of the platform 108 is open, the ridges 404 allows consistent transfer of grocery products from the platform 108 to the display area 106. Transfer occurs when the door 206 at the front of the platform 108 is open and the platform conveyor 210 and display conveyor 302 are operational.

Figure 5A:
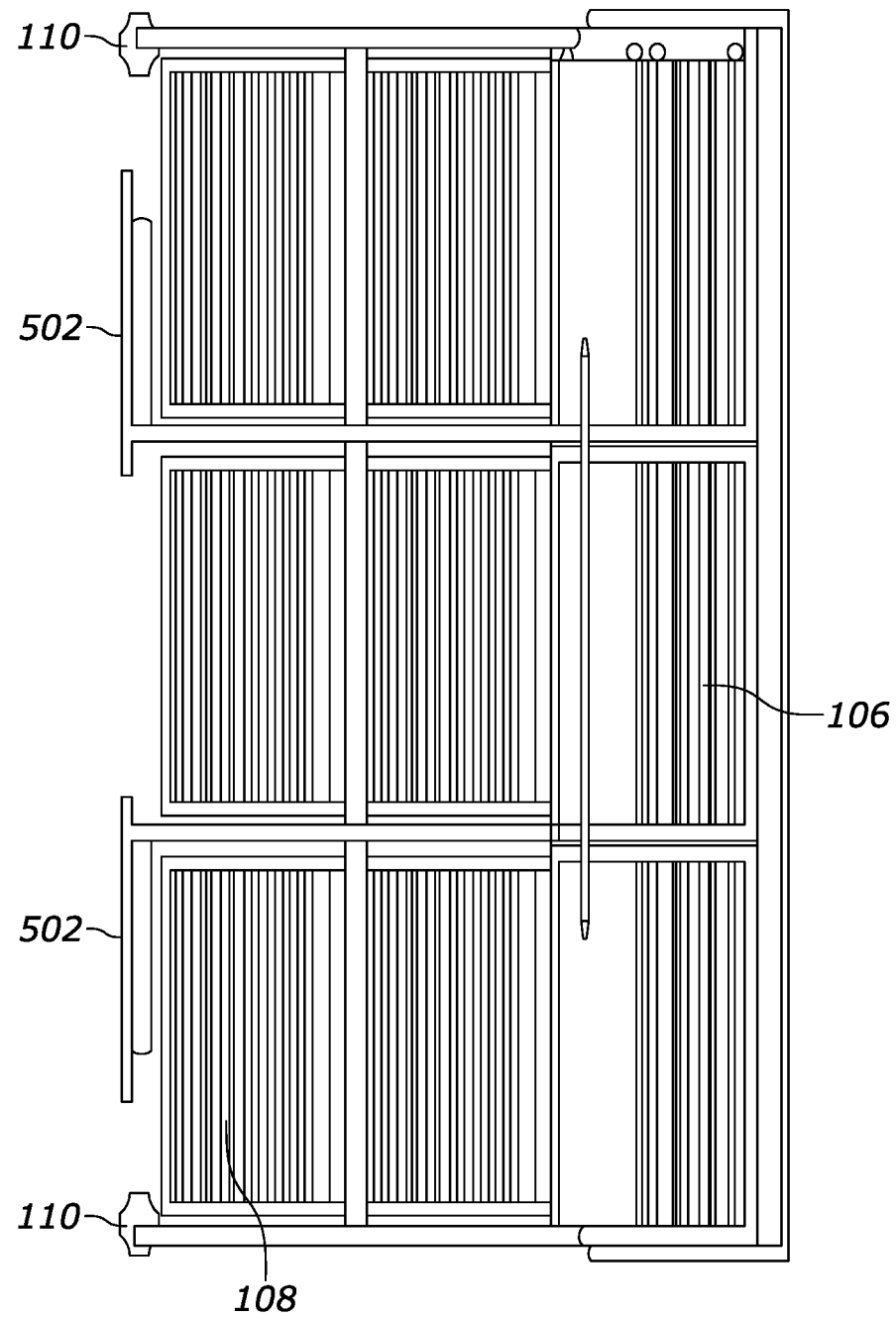
FIG. 5A is a top perspective view of the system with the top of the grocery stand unit removed.

FIGS. 4 and 5A also disclose a conventional cooling system 410 within the grocery stand unit 102 to provide appropriate temperatures to the grocery products. The cooling system 410 can comprise of a plurality of fans 502. The number of fans 502 within a cooling system 410 in a grocery stand unit 102 may differ from the number of restocking systems 100 within a grocery stand unit 102.

Figure 5B:
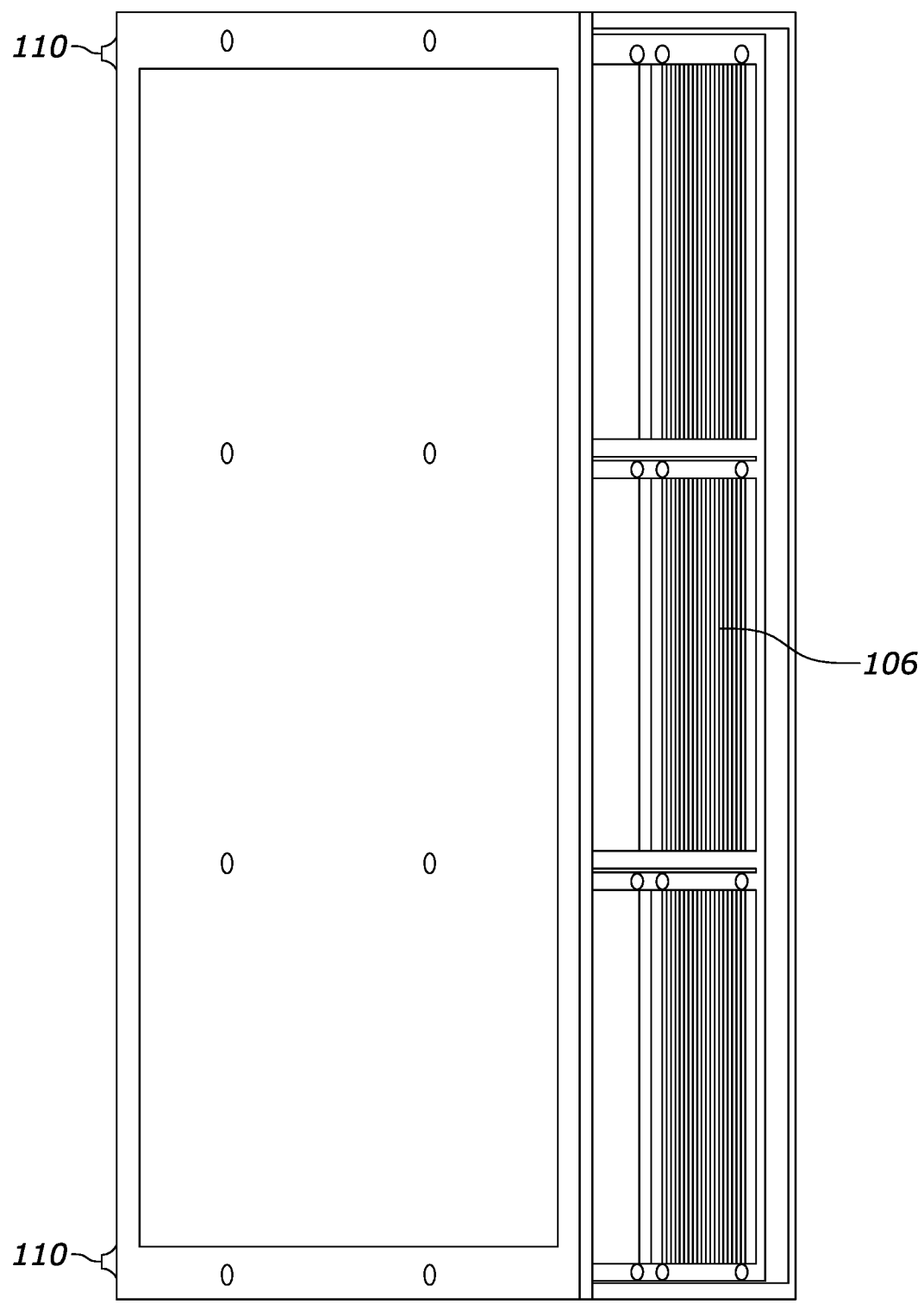
FIG. 5B is a top perspective view of the grocery stand unit.

FIGS. 5A and 5B show the grocery stand unit 102 from a top plan view.

Unless specified, the methods disclosed herein may be performed in any order. The particular order of the process steps and/or operations discussed herein do not limit the scope of the invention as claimed below.

Those of ordinary skill in the art will conceive of other alternate embodiments of the invention upon reviewing this disclosure. Thus, the invention is not to be limited to the above description, but is to be determined in scope by the claims which follow.

What is claimed is:

1. A system for displaying and restocking grocery products, comprising:
    a grocery stand unit having an internal storage area and a display area, wherein the display area is at a downward angle;
    a plurality of platforms in the internal storage area adapted to hold grocery products, wherein the plurality of platforms each include a platform conveyor having ridges;
    a weight sensor capable of detecting a weight of grocery products in the display area; and
    a platform circulating means operatively connected to the weight sensor for circulating the plurality of platforms along a closed path with respect to the display area for restocking the display area based on the weight of the grocery products in the display area thereby moving the grocery products in the internal storage area to the display area, wherein the platform conveyor having the ridges facilitates the moving of the grocery products.

2. The system of claim 1, wherein the display area includes a display conveyor.

3. The system of claim 2, wherein the display conveyor comprises a plurality of intermediate conveyors.

4. The system of claim 1, wherein the grocery stand unit defines an opening in the grocery stand unit for accessing the internal storage area of the grocery stand unit.

5. The system of claim 1, wherein each platform includes a weight sensor.

6. The system of claim 5, further includes a light system operatively connected to the weight sensor to indicate that platforms are empty.

7. The system of claim 1, wherein the grocery stand unit has a cooling system for maintaining a preferred temperature in the grocery stand unit.

8. The system of claim 1, wherein the grocery stand unit has a door connected to each platform.

9. A system for displaying and stocking grocery products, comprising:
- a grocery stand unit defining an internal storage area and a downward angled display area, the downward angled display area including a display conveyor;
- a plurality of platforms in the internal storage area adapted to hold grocery products, each platform including a platform conveyor having ridges;
- a weight sensor capable of detecting removal of grocery products from the grocery stand unit included in the downward angled display area;
- an opening in the grocery stand unit for accessing the internal storage area of the grocery stand unit; and
- means for rotating the display conveyer and each of the platform conveyors based on detecting the removal of the grocery products thereby facilitating movement of the grocery products in the internal storage area to the downward angled display area.

10. A method for restocking a grocery stand unit, comprising the steps of:
- providing a grocery stand unit with an internal storage area and a display area, a plurality of platforms in the internal storage area adapted to hold grocery products, wherein each of the plurality of platforms includes a platform conveyor having ridges, and a weight sensor capable of detecting the weight of grocery products in the display area; and
- upon detecting removal of grocery products from the display area using the weight sensor, cycling the platforms and opening a door connected to the platforms thereby
- conveying the grocery products from the plurality of platforms onto the display area.

* * * * *